April 8, 1952     E. H. HUGENHOLTZ     2,591,940
IMPULSE GENERATOR
Filed Dec. 6, 1947
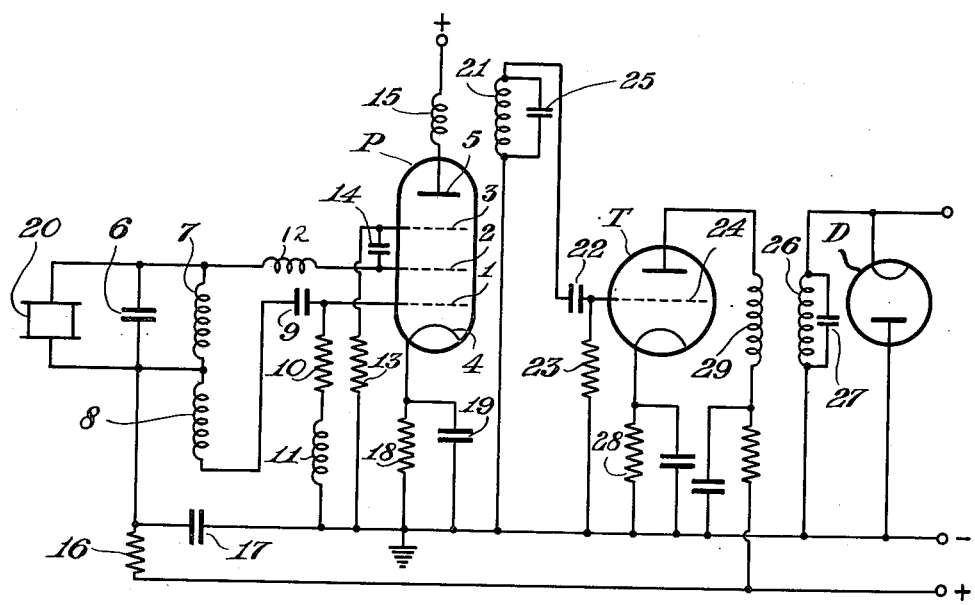
INVENTOR.
EDUARD HERMAN HUGENHOLTZ.
BY
AGENT.

Patented Apr. 8, 1952

2,591,940

UNITED STATES PATENT OFFICE 2,591,940

IMPULSE GENERATOR

Eduard Herman Hugenholtz, Eindhoven, Netherlands, assignor to Hartford National Bank and Trust Company, Hartford, Conn., as trustee Application December 6, 1947, Serial No. 790,143
In the Netherlands September 16, 1946

Section 1, Public Law 690, August 8, 1946
Patent expires September 16, 1966

6 Claims. (Cl. 250—36)

The invention relates to an impulse generator constituted by a relaxation oscillator of the transitron type.

In known circuits for generating pulses using a relaxation oscillator of the transitron type, the repetition rate of the generator pulses depends on the time constants of the resistance-capacitance circuits as well as changes in supply voltages and stray voltages in the circuit. Consequently, pulse generators of this type do not exhibit a high degree of either frequency or phase stability.

The object of the present invention is to provide an improved relaxation generator of the transitron type adapted to produce pulses having a short duration and a relatively high repetition rate with a high degree of frequency and phase stability.

For a complete description of the invention and of the operation of the transitron reference may be made to the "Proceedings Institute of Electrical Engineers" of February 1939, page 88 ff.

Briefly stated, an arrangement in accordance with the invention comprises a tube having at least three grids, the first two grids of which together with the cathode constitute a backcoupled oscillation generator, and the third grid of which, located between the second grid and the anode, is connected through a condenser and leakage resistance to the second grid. If the potential of the third grid varies, for instance in a negative sense, the anode-current, due to the third grid acting as a current divider between the anode and the second grid, will decrease and the current to the second grid will increase, which involves a drop of potential of the second grid. The condenser coupling transmits this voltage drop to the third grid which consequently becomes still more negative, and so forth. The result is that whenever the two grids 1 and 2, which oscillate in phase-opposition, pass through their voltage zero-point a current impulse occurs in the tube, which impulse, owing to the aforesaid interaction of grids 1 and 3, is abruptly suppressed immediately upon its appearance, so that this circuit-arrangement permits the production of pulses having steep edges.

In order that the invention may be more clearly understood and readily carried into effect, it will now be described more fully with reference to the accompanying drawing, given by way of example.

In this case a pentode P serves as a transitron if the grids 1, 2 and 3 are located in this order of succession between the cathode 4 and the anode 5. The grid 2 is connected, as far as high-frequency currents are concerned to the cathode, through a coil 7 tuned by a condenser 6, whereas the grid 1 is connected to the cathode through a coil 8 coupled with coil 7, so that this system operates as a back-coupled oscillation generator, the tuned circuit 6, 7 determining the frequency. The connection of grid 1 to coil 8 is effected through a grid condenser 9 and a leakage resistance 10, in series with which a high frequency choke 11 is connected. Between grid 2 and the circuit 6, 7 is connected a coil 12, the purpose of which is set out hereinafter. The grid 3 is connected through a leakage resistance 13 to the cathode and through a condenser 14 to the second grid. It is chiefly the latter connection between the two grids 2 and 3, in combination with coil 12, which produces the aforesaid transitron effect.

The anode 5 is connected through a coil 15 to the positive terminal of the source of anode voltage, to which terminal is also connected the grid 2 through a resistance 16 and smoothing condenser 17. The cathode 4 is earthed through a resistance 18 and parallel condenser 19. Therefore the grid 2 exhibits on an average a comparatively high positive potential and serves as an anode in the back-coupled generator, whereas grids 1 and 3 exhibit on an average a negative potential which is determined by the voltage drop across the cathode resistance 18.

The device so far described is capable of producing, with a constant frequency, the value of which is determined by the proportions of the circuit 6, 7, current pulses of the aforesaid character, which as long as we are not concerned with excessively high frequencies, may directly be obtained from the coil 15 and used for controlling a transmission generator. In this case the frequency stability may further be improved by parallel-connection of a crystal 20 to the circuit 6, 7.

If we are not concerned with excessively high frequencies, the aforesaid steep edges of the pulses may be rendered even steeper with the aid of coil 12 which is tuned to a high frequency by means of the combined capacity of grids 2 and 3, so that the voltage variations is determined by this LC-circuit. Under certain conditions it may be advantageous to replace coil 12 by a resistance. At any rate one of the two is desired, since the surge voltage is fundamentally produced through this element.

Since a current pulse will traverse the tube P whenever potential difference between the grids 1 and 2 passes through zero, frequency doubling would occur. If this should be avoided, the values 9, 10 and 11 should be chosen to be such as to effect a slight phase-displacement, thus ensuring that with every second passage through zero of the aforesaid potential difference the grid 1 is still sufficiently negative to prevent the tube from being opened.

The duration of the current pulses is determined by the quotient of the combined earth capacities of the grids 2 and 3 on the one hand and by the steepness of the second grid with respect to the third on the other hand. At values of these characteristics which are used in practice this duration is sufficiently short with frequencies up to approximately 2 magacycles/sec. For higher frequencies the circuit-arrangement just described may advantageously be combined with a device in which the impulse duration is reduced according to convenience.

As an example thereof the drawing represents a combination of a triode T and a diode D, in which the (negative) pulses are transmitted in a positive sense to the grid 24 of tube T through a coil 21 coupled with coil 15 via a grid-condenser 22 and a leakage resistance 23. The coil 21 is tuned by its natural capacity 25 to a high frequency of, for example, 1 megacycles/sec.

With each impulse a damped oscillation is produced through the circuit 21, 25. The time constant of the system 22, 23 is chosen to be such that at the instant, at which the pulse occurs, the tube T is just cut off. The tube is rendered conductive by the first positive half cycle of the damped oscillation, when a strong grid-current pulse occurs. Due to this the condenser 22 is heavily charged negatively on the side of the grid 24. The values are chosen to be such that the condenser gradually discharges, but the peaks of the following cycles of the damped oscillation are just incapable of unblocking the tube. Thus it is achieved that on the occurrence the following pulse, the grid 24 has again acquired the voltage which is most advantageous for the purpose i. e. the voltage at which the tube just does not unblock. For instance, satisfactory results are obtained with a value of 50 micromicrofarads for the condenser 22 and 50,000 Ω for the resistance. Consequently, tube T is opened with each positive voltage pulse arriving at the grid with a great amplitude, but immediately after that it is cut-off again, so that each time there occur two very rapid current pulses with the total anode-current of the triode.

The anode voltage to be applied may be chosen to be very high without being troubled by excessive dissipation, since the triode is opened only during a small fraction of the time. This also applies to the anode of tube P.

The anode circuit of the triode T, in which every first pulse will occur again with negative polarity, includes a coil 25 with which a coil 26 is coupled, so that the polarity of the first impulses again reverses therein. The coil 26 is tuned by its natural capacity 27 to a higher frequency than coil 21, for example to 20 megacycles/sec. This coil, from which the pulses may finally be taken, is connected in parallel with a diode D for damping the negative cycles in the event of the tuned coil 26 dying down. Thus the duration of the pulses is reduced to $1/40\ \mu$ sec.

In a practical embodiment the circuit 6, 7 was tuned to 100 kcs., to which value had also been fixed the time constant of the resistance 13 with the condenser 14. That of the resistance 10 with condenser 9 was much smaller. In conjunction therewith the choke 11 is connected in series with the resistance 10, since otherwise this comparatively small resistance would cause inadmissible circuit damping.

The cathode resistances 18 of tube P, and 28 of tube T mainly serve to prevent excessive dissipation if the oscillating action would cease, so that these tubes would be open for the full time.

What I claim is:

1. A pulse generating system comprising an electron discharge tube including a cathode, a control grid, a screen grid, a suppressor grid and an anode, a resonant circuit coupled between said screen grid and said cathode, a capacitance connected between said suppressor grid and said screen grid to maintain the suppressor and screen grid at the same alternating current potential; means to maintain the suppressor grid negatively biased with respect to said cathode, means to impress positive potentials on said anode and said screen grid having respective values at which a transitron effect is produced in said tube, means coupled to said resonant circuit to derive therefrom a periodic feedback voltage, and means to apply said feedback voltage to said control grid to render said tube periodically non-conductive to develop pulses at said anode at a rate determined by the frequency characteristic of said resonant circuit.

2. A pulse generating system, as set forth in claim 1, wherein said resonant circuit is constituted by an inductance-capacitance parallel resonant network connected in shunt relation with a piezoelectric crystal.

3. A pulse generating system comprising an electron discharge tube including a cathode, a control grid, a screen grid, a suppressor grid and an anode, a resonant circuit having one end thereof coupled to said screen grid and the other end thereof coupled to said cathode, a capacitance connected between said suppressor grid and said screen grid to maintain the suppressor and screen grid at the same alternating current potential, means to maintain the suppressor grid negatively biased with respect to said cathode, means to impress positive potentials on said anode and said screen grid having respective values at which a transitron effect is produced in said tube, means coupled to said resonant circuit to derive a periodic feedback voltage therefrom, means to apply said periodic feedback voltage to said control grid to render said tube periodically non-conductive to produce pulses at said anode at a rate determined by the frequency characteristic of said resonant circuit, and an inductance interposed between said screen grid and said one end of said resonant circuit, said inductance in combination with the interelectrode capacity of said control grid and said screen grid forming a network tuned to a frequency exceeding that of said resonant circuit whereby the steepness of said pulses is increased.

4. A system, as set forth in claim 3, further including a second resonant circuit coupled to the anode of said tube and shock excited by the pulses developed therein, said second resonant circuit being tuned to a frequency exceeding that of the first resonant circuit.

5. A pulse generating system comprising an electron discharge tube including a cathode, a control grid, a screen grid, a suppressor grid and an anode, an inductance-capacitance parallel resonant circuit having one end thereof coupled to said screen grid and the other end thereof coupled to said cathode, a coupling capacitance connected between said suppressor grid and said screen grid, means to maintain said suppressor grid negatively biased with respect to said cathode, means to apply positive potentials to said screen grid and said anode having respective values at which a transitron effect is produced in said tube, and a feedback means including a coil in series with a capacitor coupling the other end of said resonant circuit to said control grid to render said tube periodically non-conductive to develop pulses at said anode at a rate determined by the frequency characteristic of said resonant circuit.

6. A pulse generating system comprising an electron discharge tube including a cathode, a control grid, a screen grid, a suppressor grid and an anode, and inductance-capacitance parallel resonant circuit, an impedance connected between one end of said resonant circuit and same screen grid, a feedback coil having one end connected to the other end of said resonant circuit and the other end capacitively coupled to said control grid, a coupling condenser connected between said screen grid and said suppressor grid, means to maintain said suppressor grid negatively biased with respect to said cathode, means to apply positive potentials to said screen grid and said anode having respective values at which a transitron effect is produced in said tube, said feedback coil producing a blocking voltage on said control grid rendering said tube periodically non-conductive to develop pulses on said anode at a rate determined by the frequency of said resonant circuit.

EDUARD HERMAN HUGENHOLTZ.

REFERENCES CITED

The following references are of record in the file of this patent:

UNITED STATES PATENTS

| Number | Name | Date |
|---|---|---|
| 2,119,357 | Schalkwijk | May 31, 1938 |
| 2,130,272 | Ford | Sept. 13, 1938 |
| 2,226,561 | Herold | Dec. 31, 1940 |
| 2,230,097 | Whitaker | Jan. 28, 1941 |
| 2,237,661 | Ernst | Apr. 8, 1941 |
| 2,389,004 | Schroeder | Nov. 13, 1945 |
| 2,417,834 | Lord | Mar. 25, 1947 |